(No Model.)
F. G. C. PEEK.
HOUSEHOLD FURNITURE.
No. 318,132. Patented May 19, 1885.
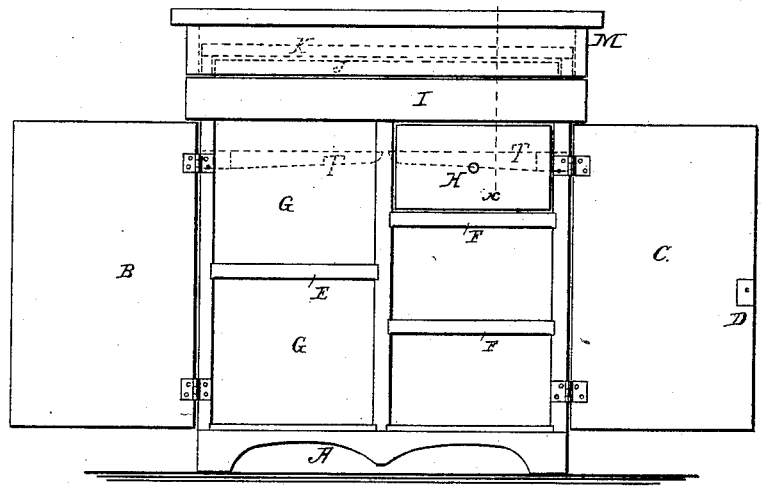
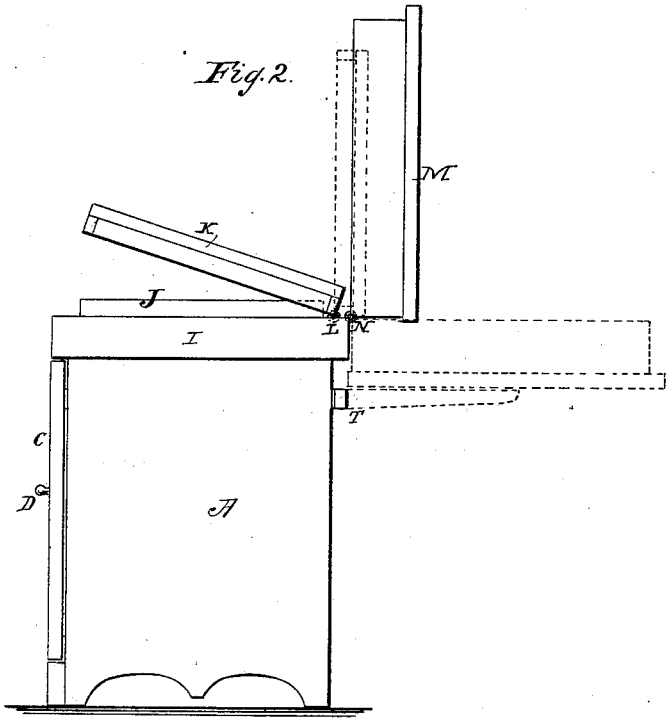
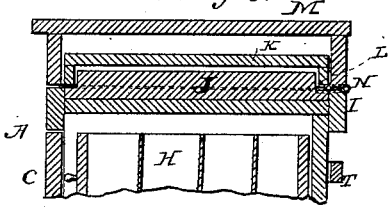
WITNESSES:
Edward Wolff
Herman Guelow
INVENTOR
Felix G. C. Peek
BY
Chas. C. Gill
ATTORNEY

United States Patent Office.

FELIX G. C. PEEK, OF PHILOMATH, GEORGIA.

HOUSEHOLD FURNITURE.

SPECIFICATION forming part of Letters Patent No. 318,132, dated May 19, 1885.

Application filed November 10, 1884. (No model.)

*To all whom it may concern:*

Be it known that I, FELIX G. C. PEEK, a citizen of the United States, and a resident of Philomath, in the county of Oglethorpe and State of Georgia, have invented certain new and useful Improvements in Household Furniture, of which the following is a specification.

The invention has relation to household furniture; and it consists in a novel combined dough and pastry stand, board for dressing meats, &c., and a repository for articles used in cooking.

The object of the invention is to produce a piece of kitchen-furniture which may be utilized in part as a pantry and serve the purpose of a meat-block, dough-rolling board, &c., the whole being combined in one article, whereby much time, labor, and space in the kitchen may be saved.

The invention will be more fully understood from the detailed description hereinafter presented, reference being had to the accompanying drawings, in which—

Figure 1 is a front view of a stand embodying the invention, the doors of same being shown open. Fig. 2 is an end view of same, the covers of the stand being shown in a raised position, and Fig. 3 is a detached vertical section on the line *x x* of Fig. 1.

In the drawings, A denotes the outside frame of the article, which is preferably rectangular in outline and may be of any suitable construction, it being the object to produce a stand which will be substantial in structure and of an attractive appearance. Upon the front of the stand are the hinged doors B C, which will be provided with a suitable latch, D, so as to retain them in a closed position when desired. Between the sides of the stand are provided partitions E F, forming compartments to contain spice, baking-powder, extracts, &c., the larger compartments G being intended to contain flour, lard, and other matters used for cooking purposes. One of the smaller compartments of the stand should, for convenience, be provided with a spice-box, H, suitably partitioned to permit various kinds of spices to be kept in one box without their being intermingled.

The various useful purposes to which the compartments are adapted will readily suggest themselves, and need not be more particularly described.

The construction of the upper part of the stand is of great importance and utility. Around the upper portion of the stand is a narrow frame or molding, I, within which, and resting upon the vertical portions of the stand, is the slab J, which may be of marble or wood, and its purpose is to afford a suitable surface for dressing meats, and, when not desired for that purpose, to be used for pastry. The vertical edges of the meat-slab J, which project above the surface of the frame or molding I, extend upward about on a line with the inner surface of the sides, back, and front of the stand, as shown, and upon this slab is placed the pastry-board K, which is provided with sides and ends passing over the vertical edges of the meat-slab, the pastry-board being hinged at L, so that it may be turned upward from the slab when the latter is to be used. The sides and ends of the pastry-board K are about on a line with the outer surface of the ends and back of the stand, whereby the upper surface of the frame or molding I is left unobstructed, and upon it rests the lower edges of the top or cover M, which is hinged at N, and is of suitable configuration to add a finished appearance to the upper portion of the stand. The sides and ends of the top or cover M are of sufficient depth to pass over the pastry-board K and to leave a sufficient space between said board and the inner surface of the top or cover to contain a rolling-pin, or biscuits, dough, and other articles of pastry which are not of too great a height.

When the stand is in use, the top or cover may be turned back on its hinges, leaving the pastry-board exposed; or, if it is not desired to use the pastry-board, it may be turned up into the cover, whereby the meat-block will be uncovered and may be used.

The stand contains in itself, as will be observed, various useful articles, and is not of a nature to prove objectionable when in use.

When the stand is to be used near the wall of the room, the cover M, when open, may rest against the same; but when said cover cannot be turned upward against the wall it will be necessary to provide hinged supports T upon the back of the stand for this purpose. When the cover is to be opened, the supports will be turned outward, and when the stand is not in use the supports will be folded against the back thereof out of the way.

What I claim as my invention, and desire to secure by Letters Patent, is—

1. The stand having the removable cover M, the removable pastry-board K, and the stationary meat-slab J, a space being left between the pastry-board and the top of the cover, substantially as and for the purpose described.

2. The stand consisting of the frame A, divided into suitable compartments and having doors B C, the upper part of the stand consisting of the meat-slab J, pastry-board K, and top or cover M, the two latter being removable and having a space between them, substantially as and for the purpose set forth.

Signed at Woodstock, in the county of Oglethorpe and State of Georgia, this 27th day of October, A. D. 1884.

FELIX G. C. PEEK.

Witnesses:
SAML. B. DANIEL,
BENJ. F. DANIEL.